Figure 1:
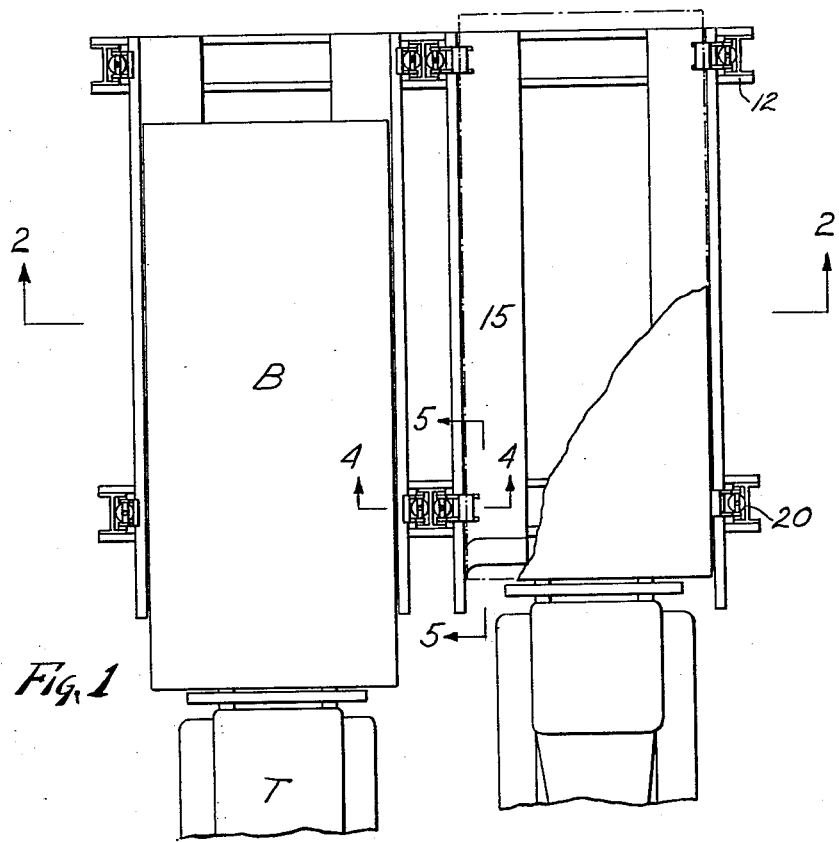

Feb. 2, 1937. B. F. FITCH 2,069,236
MECHANISM FOR RAISING AND SUPPORTING DEMOUNTABLE BODIES
Filed July 2, 1934 3 Sheets-Sheet 1

Inventor
Benjamin F. Fitch,
By Bates, Golrick & Fears
Attorneys

Feb. 2, 1937. B. F. FITCH 2,069,236
MECHANISM FOR RAISING AND SUPPORTING DEMOUNTABLE BODIES
Filed July 2, 1934 3 Sheets-Sheet 2
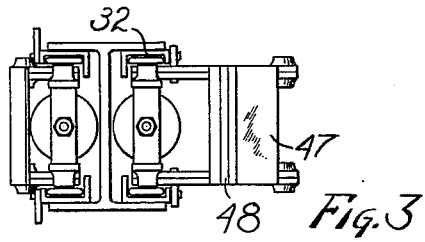
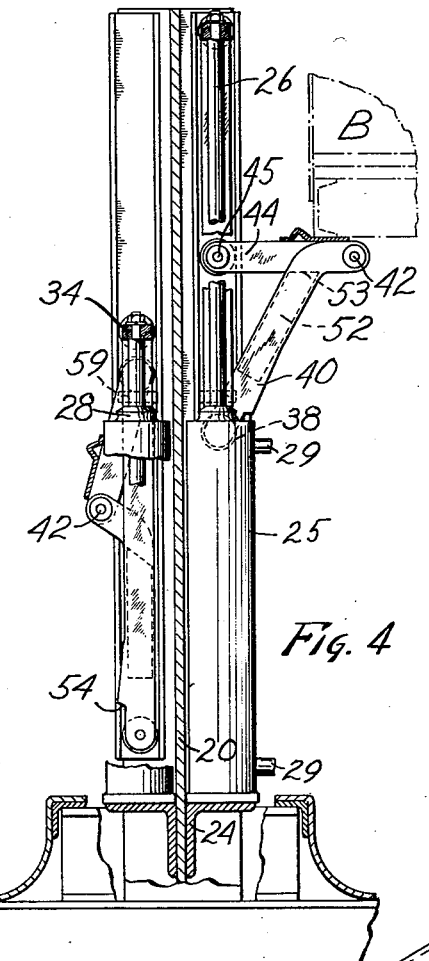
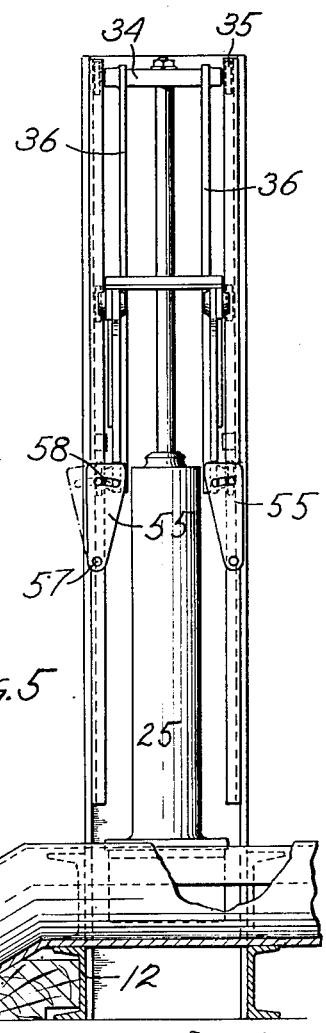
Inventor
Benjamin F. Fitch,
By Watts, Golrick & Tear
Attorneys

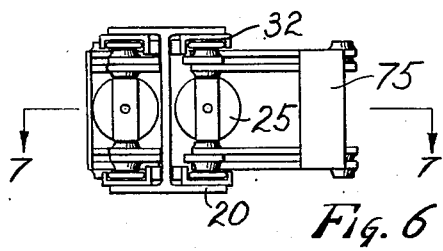
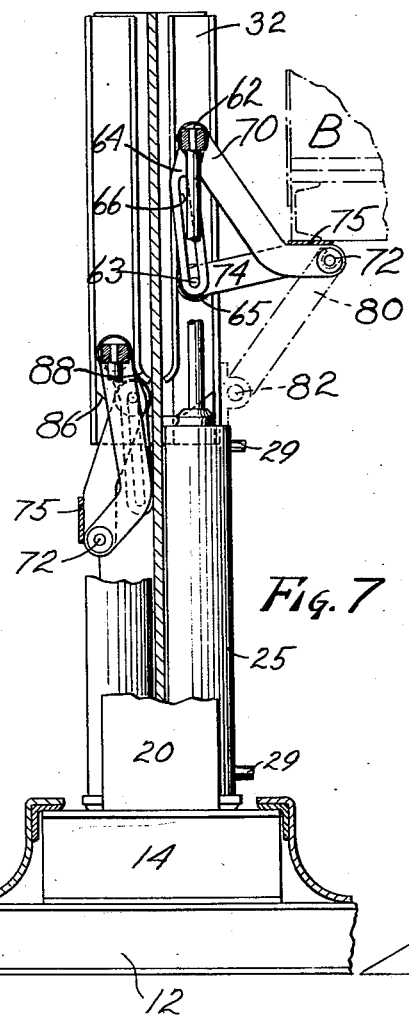
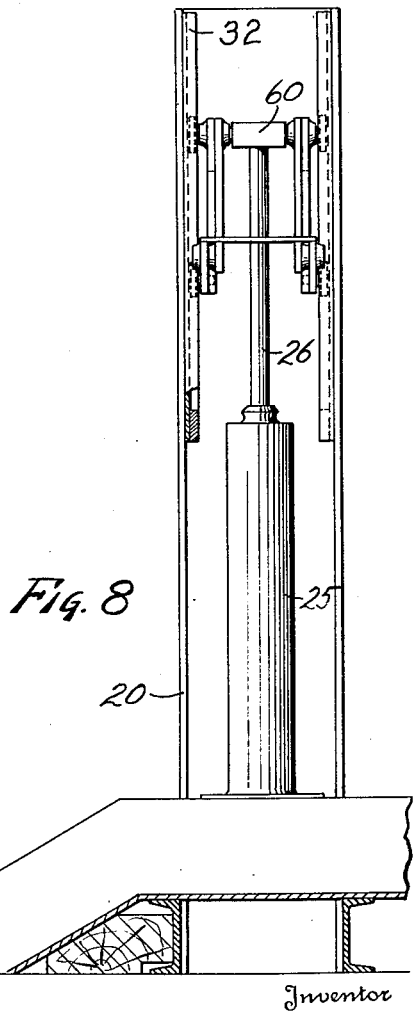

Patented Feb. 2, 1937

2,069,236

UNITED STATES PATENT OFFICE 2,069,236

MECHANISM FOR RAISING AND SUPPORTING DEMOUNTABLE BODIES

Benjamin F. Fitch, Greenwich, Conn., assignor to Motor Terminals Company, New York, N. Y., a corporation of Delaware Application July 2, 1934, Serial No. 733,469

20 Claims. (Cl. 254—45)

This invention is concerned with the handling of freight by means of demountable vehicle bodies, in which packages or bulk material may be stored, and which may be transported by highway trucks, railway cars or by vessel. The invention is particularly concerned with an apparatus for removing such bodies with their contained loads from a transporting vehicle, and supporting them free of the vehicle. A demountable body may be supported on the apparatus of my invention until such time as needed, and then the apparatus may be operated to deposit the body on a vehicle.

Oftentimes in the past, loaded demountable bodies would arrive at a freight depot and remain there for considerable intervals of time. Such retention might be due to the fact that the consignee of the freight did not promptly call for his goods, or perhaps that the receiving vehicle for the body had not yet arrived. Frequently, after the containers had been emptied of their goods, they were retained at the depot until such time as they were again loaded for transportation to another destination.

It has been my common practice to employ an overhead crane to remove such a demountable body from a vehicle and transport the body to a place within the freight depot, where it could be stored until such time as it was again needed. An alternative method of storing these demountable bodies was provided by using a crane to raise the body clear of the vehicle, withdrawing the vehicle from beneath the suspended body and then lowering the body onto "horses" or other supporting means placed in the region previously occupied by the vehicle.

While the crane operation just mentioned has been found satisfactory where there was a sufficient volume of freight to be transferred to warrant the expense of installation, there are occasions where comparatively few bodies are to be removed from their vehicles, or where there is not sufficient head room for an effective overhead crane. This is more likely to happen at shippers' platforms, where ordinarily only a small number of body settings is required. In all such cases it is desirable to provide simple raising devices which may be mounted on the ground and are arranged to engage a body and lift it sufficiently to clear the vehicle and thereafter support it while the vehicle performs other work. The present invention admirably provides for such situations.

It has been an object of my invention to provide an efficient and economical substitute for an overhead crane where it is desired to merely lift and support the body. A further object of my invention has been to provide an independent unit adjacent the truck or vehicle entry way, adapted to handle a demountable body without the aid of any outside mechanism other than that required to actuate the apparatus. Still another feature of my invention has had for its objective a device adapted to remove a demountable body from a vehicle and yet able to be rendered automatically inactive and in a position where it does not impede the vehicle entry way when in an idle position.

A further object of my invention has been the construction of a device which may support a demountable body at a predetermined height in a vehicle entry way, and yet be operative to permit it to deposit such a body upon a transporting vehicle when the same is placed within the vehicle entry way and positioned beneath the demountable body.

The supporting apparatus, which is the subject of the present invention, has been shown in this disclosure as designed for use in a freight depot serving motor trucks. It is, however, to be understood that my invention may be used in conjunction with any vehicle adapted to transport demountable bodies.

My invention may be incorporated with a freight station platform of a carrier or a freight loading platform of a shipper, or as a separate unit independent of any platform. The invention comprises lifting and supporting devices located on opposite sides of a space, which may receive a truck adapted to carry a demountable body. Such intervening truck space I call an entryway, without regard to whether it is associated with an elevated platform or is on the same level with the adjacent area. Thus a street or driveway area at each vehicular location may be designed to serve a motor truck carrying a demountable body. Along the boundary line of such entryway or vehicular space I propose to locate upright supporting columns, and I mount on these columns extensible brackets, which, in their active positions, project into the entryway between the columns far enough to underlie a demountable body located on a truck within such entryway, and I provide power mechanism to lift the extended brackets.

The brackets, in addition to being so carried that they extend horizontally into the entryway to support a body, are also enabled to collapse and lie against the supporting column, in which position they do not obstruct, to any appreciable extent, the space within the entry. This leaves the area to be occupied by a vehicle available for the parking of trucks, drays or wagons, with bodies rigidly attached thereto, for loading or unloading of consignments by conventional labor methods. The operating mechanisms, adjacent the supporting columns, and suitably supplied with power from an outside source, render the extending brackets active or inactive as desired. Not only does this mechanism move the brackets into engaging position with the demountable body, and then raise the body clear of the truck, but by reason of their construction the brackets may continue to support the demountable body without any other supporting aid for a period of time determined only by the question as to how long a body so supported is to be retained idly within the freight depot.

Various other features of my invention will become apparent from the specification and the accompanying drawings. The essential novel features are summarized in the claims.

Figure 2:
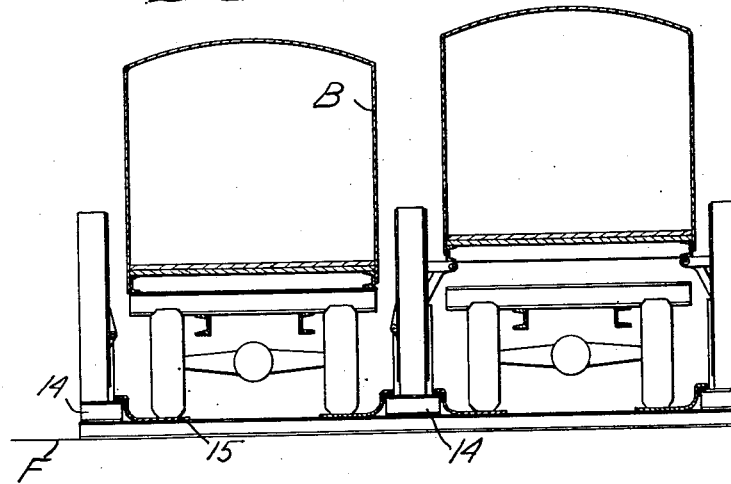

Referring now to the drawings, Fig. 1 is a plan showing two entry ways, trucks positioned with respect to the entry ways, and the supporting and lifting apparatus of my invention located along the entry sides; Fig. 2 is a somewhat diagrammatic section, taken through the plan of Fig. 1, as indicated by the line 2—2; Fig. 3 is a plan of a portion of Fig. 1 on a greatly increased scale, showing the supporting column and the adjacent body-carrying mechanism; Fig. 4 is a vertical section, through the column and its associated carrying mechanism, as indicated by 4—4 of Fig. 1; Fig. 5 is a sectional side elevation, showing various features of the supporting mechanism, as indicated by 5—5 of Fig. 1; Fig. 6 is a plan view, somewhat similar to Fig. 3, showing a modification of my invention; Fig. 7 is a vertical section of such modification, as shown by 7—7 of Fig. 6; Fig. 8 is a sectional side elevation, parallel to the side of an entry, showing the modification of Figs. 6 and 7.

In permanent installations it will be desirable to position the supports for the lifting and supporting apparatus on suitable foundations firmly embedded in the ground. A special form of construction may be used when my invention is to be installed in a place where embedded foundations are impracticable or too costly. It is such special foundation that I have illustrated in the drawings, but the following description of such embodiment, except as to the specific foundation, will be applicable to installations having embedded foundations.

I have shown in Figs. 1 and 2 a pair of parallel adjacent truck entry ways, with the lifting and supporting mechanism on opposite sides thereof. As there shown, suitable transverse channels 12, mounted back to back and spaced apart, and resting on the general foundation F, are carried adjacent the end of the entry ways to provide transverse sills. Short sections of channel 14 are mounted coincidentally with the members 12, in the region dividing adjacent entry ways. Truck runways 15 are provided. As shown, these runways are partially trough-like in cross-section, with the bottom portion of the trough resting on the transverse sills 12. As the bottom portion of the runways 15 approaches the side of the entry way, it flares upwardly to form a side, and then again extends horizontally to provide a flange adapted to rest against the upper face of the channel 14, as shown in Figs. 2 and 4. At the inner end of the entry the runways may curve upwardly to form a stop for truck wheels, and at the open end of the entryway the runways slope downwardly, as shown in Fig. 5, providing an inclined plane to facilitate driving the truck from the foundation F onto the runways 15. Suitable wood brace blocks 17, whose surfaces conform to the inclined plane of the runway 15, the top of the foundation F and the web of the channel 12 act as braces for the inclined portions of the runways 15.

Trucks are ordinarily backed into an entry way, with the wheels first passing up the inclined portion of the runway 15 and then following the runway until properly positioned or until the rear wheels strike the rear bumper portion of the runway. A suitable motor truck T of the conventional form is provided, the frame work of which is so constructed that demountable bodies B may be carried thereon. To permit the operation of the extending brackets as they engage or disengage a demountable body, sufficient clearance is provided at suitable places on the truck frame for their operation.

Vertical supporting columns are used to carry the various portions of my body lifting and supporting mechanism. To this end, I provide suitable I-beams or H-column members 20, with their webs extending parallel to the entry way. The flanges of such members snugly fit between the adjacent transverse sills 12 and may be welded, riveted or otherwise fastened thereto. The members 20 are braced by the short channel members 14, bearing against adjacent flanges of the member 20 and rigidly fastened thereto.

I find that the most efficient way of operating the bracket portions of my mechanism is attained by the use of an oil operated cylinder and plunger of the form commonly used to provide reciprocal movement. A hollow vertical cylinder 25 is mounted on a suitable angle bracket 24, welded or otherwise fastened to the web of the member 20. A reciprocable piston is connected to a piston rod 26, which protrudes through a stuffing box 28 adjacent the upper face of the cylinder 25. Fluid connections 29 are provided adjacent the top and bottom of the cylinder.

If, for example, it is desired to raise the piston and its connected parts, oil is admitted under pressure through the lower connection 29 and as the cylinder fills the piston is forced upwardly. If it is desired to cause the piston to drop with respect to the cylinder, it is ordinarily necessary only to remove the oil from beneath the piston. If, however, the weight of the parts is not sufficient to cause the piston to drop within the cylinder, oil may be admitted through the upper opening 29 and thus force the piston downwardly.

In ordinary practice, it is desirable that four such body-raising cylinder mechanisms as above described be used with each truck entry way; one complete unit of such mechanism being mounted approximately at each of the four corners of the entry way.

Although various forms of brackets may be used in my invention, I have chosen to show a preferred form and a modification as desirable piston-operated means for engaging and supporting the body. What I call the "preferred" form is shown in Figs. 3, 4 and 5, while the modification is illustrated by Figs. 6, 7 and 8.

Referring now to Figs. 4 and 5, it will be seen that the piston rod 26 is maintained in alignment with the axis of the cylinder 25, by a runway 32 in the form of a channel member, welded or otherwise fastened to the inner face of the flanges of the supporting column 20, and rollers 35 occupying the channels and rotatably carried on a cross-arm 34 secured to the protruding end of the piston rod 26. Depending from the cross-arm 34 at each end thereof are members 36. Adjacent the lower ends of the members 36 are a second pair of rollers 38, also adapted to ride in the trackway of the channels 32. There is thus provided a readily reciprocable yet firm support for the piston rod 26, maintaining it in axial alignment with the cylinder 25.

The lower portion of the bracket supporting mechanism proper is carried by the bottom portion of the member 36. Each bracket is collapsible and comprises a pair of bell cranks 40, a pair of links 44 pivoted thereto and a cross plate 47 connecting the two pairs. Pivotally fastened to the members 36 adjacent their lower ends (preferably about the same shaft that carries the lower rollers 38) are bell cranks 40. Pivotally fastened to the bell cranks 40 by a suitable pin 42 are links or upper bracket members 44. The free ends of these upper bracket members carry rollers 45, similar to the rollers 35 and 38, and riding in the trackway of the channel members 32.

The bell crank 40 and the bracket member 44 are operatively connected, as above described, with the piston rod 26 and its cooperative cylinder 25. To prevent the bracket members 44 from collapsing about the pivot 42, with respect to the bell cranks 40, members 52 are provided on the inner side of the bell cranks and having an upper edge 53 adapted to register with the underside of the bracket 44 when in the position shown in the right-hand side of Fig. 4. Extending across the top of the bracket member 44 is a suitable plate 47, adapted to underlie a demountable body B. To prevent sidewise slipping of the body B on the plate 47, an upwardly extending rib 48 is provided.

The bell cranks and their associated bracket members are rendered active by the operation of the piston rod 26. As the piston rod moves from the inactive position shown in the left-hand side of Fig. 4 to the active position, as shown on the right-hand, the bracket and bell crank members move upwardly and outwardly to underlie the demountable body which is supported on the truck within the entry way. This is due to the fact that the bottom end of the bell cranks 40 must follow the members 36 by reason of their pivotal connection to these members, which, in turn, are directly connected to the piston rod 26. As this movement takes place, the free ends of the brackets 44, by reason of their weight, tend to remain in the same position, and as the pivot 42 of the bracket and bell crank rises the bracket becomes extended. The extending movement of the bracket continues by the movement of the bell crank 40, until the upper edge of the member 52 abuts the underside of the link 44, whereupon the open position shown at the right hand side of Fig. 4 will have been assumed. Once this bracket position has been attained, further upward movement of the mechanism causes the plate 47 to directly engage the underside of the demountable body B, and as the piston rod 26 continues to rise to the height shown in Fig. 4, the body will be raised from the vehicle on which it was deposited.

It is desirable that a latch be provided to lock the bracket mechanism in an open position, in order that it may not be necessary to maintain fluid pressure within the cylinder 25, when the body is retained suspended for a considerable length of time. To this end, a notch 54 is provided adjacent the lowermost pivot of the bell crank member 40. A suitable latch member 55 is carried on the frame at right angles to the bell crank 40 by the pivotal connection 57. An arcuate slot 58 in the member 55 cooperates with a pin in the column 20 to limit the movement of the latch. When the latch is in the position shown by the dotted lines in Fig. 5, it is inactive and has no bearing on the position assumed by the bell crank 40.

When the piston and its piston rod 26 have moved the bracket 44 and bell crank 40 to an uppermost position, the latch 55 may be swung manually to an active position, as shown by the full lines of Fig. 5, and in this position underlies an edge of the notch 54, preventing the collapse of the body-supporting mechanism. It is then safe to relieve the fluid pressure within the cylinder 25, as compression strains induced by the body are carried by the latch 55.

A suitable stop is provided to prevent downward movement of the roller 44 in the trackway 32 after a certain point has been reached, in order that collapse of the apparatus may be accomplished when it is desired to leave the entry way unimpeded. To this end a block or shoulder 59 is mounted within the channel 32 at the point where it is desired to have the collapsing of the apparatus commence.

When the member 55 has been unlatched and the pressure in the lower portion of the cylinder 25 removed, either by weight of the apparatus or through pressure induced through the upper opening 29 of the cylinder 25, the piston rod 26 and its associated parts will drop. When a predetermined point has been reached, the roller 45 will abut the shoulder 59 and be prevented from further movement. As the lower roller 38 and the bell crank 40 pivoted thereabout continue to move downwardly, the apparatus stretches out until the position shown in Fig. 4 on the left-hand side has been reached, when the inactive position of my invention has been assumed.

The modified construction of my invention shown in Figs. 6, 7 and 8, is also operated by a piston rod 26. At the upper end of this piston rod is a cross-arm 60 carrying rollers 62 adapted to move in the channel trackway 32. Modified bell crank members 64, having slots 66, depend from the cross-arm 60. Carried in the slots 66 is a shaft 63 carrying rollers 65 which operate in the runway 32. Also pivotally depending from the cross-arm 60 is a bell crank 70. At the lower end of the bell crank 70 is a pin 72, which makes a pivotal connection between the bell crank and a link member 74. The other end of the link member 74 is pivotally connected to the shaft 63 of the rollers 65, which ride in the channels 32.

As apparent from the drawings, there is a pair of each of the above described members associated with each cylinder 25 and piston rod 26. Lying across the top of the crank portion of the bell cranks 70 is a plate 75, which accomplishes the same purpose as the member 47, shown in my preferred construction. If desired, a rib may be placed on this member similar to the rib 48, to prevent sidewise sliding of the demountable body.

It is desirable that means be provided in this modified form to lock the device in an open position; that the fluid pressure in the cylinder 25 need not be maintained, while a body is supported on the apparatus. To this end the link member 80, shown by dot and dash lines in Fig. 7, is employed, being pivotally connected at 82 to the column member 20. The upper end of the link member 80 is bifurcated, so that it may embrace the pin 72, as shown in Fig. 7. When the pin 72 is in this notch, as shown, the bracket members are retained in an extended position to support a demountable body, even though fluid pressure in the cylinder is released. It is possible to engage the link member 80 with the pin 72 or release it therefrom by merely causing the piston rod 26 to rise and thus carry its associated parts high enough to permit the link member 80 to be dropped free.

The extensible supporting bracket just described is shown in a collapsed position at the left hand portion of Fig. 7 and in an extended or active position on the right hand side of that figure. When the piston rod 26 descends, the bracket supporting mechanism automatically collapses. As the descent of the piston rod takes place, the lower rollers 65 descend in the trackway 32 until they strike abutments in the form of cam surfaces 86. It will be noted that adjacent the cam portions 86, the inner side of the trackway 32 is flared inwardly, as at 88. When the rollers 65 reach this position, they are cammed inwardly until they assume the position shown in the left-hand view of Fig. 7, and are thus prohibited from further downward movement.

As the piston shaft 26 continues to descend, it draws the rollers 62 and the parts associated therewith downwardly, causing the slotted members 64 to move downwardly with respect to the rollers 65. As this movement takes place, the links 74 and the bell cranks 70 collapse with respect to each other, until the left hand position shown in Fig. 6 is reached, at which time the device is completely inactive.

When it is desired to render the apparatus active, it is merely necessary to reverse the process. Thus, fluid is admitted through the lower opening 29 to the cylinder 25 and the piston rod 26 is raised. In an inactive position, the axis of the pin 72 lies out beyond the axis of the roller 62, and hence the crank and link will open as the piston rod rises. When the sides of the slots 66 have passed along the shaft of the rollers 65 until the rollers repose at the bottom of the slot, the rollers will be cammed over the surface 86 and again rise in the slideway 32 until the right hand position of Fig. 7 is reached.

If there are any irregularities in the under surface of the body to be gripped by the four brackets of either embodiment illustrated, it is desirable that it be possible to operate each unit independently of the others. This may readily be accomplished in any well-known manner. When used with the average body, it is apparent that it will be desirable to operate the four units simultaneously and this may also be readily effected in any well-known manner.

Control devices may be provided to operate the motors or other means employed to actuate the lifting means. These controls may be so located with respect to the apparatus that they can be readily operated by a man in the transporting vehicle or by a workman on the ground, as desired.

It will be apparent, from the above description, that I have provided a comparatively cheap and simple apparatus for handling demountable bodies which incorporates several desirable features. Not only is a small, compact raising mechanism provided, associated with each truck entry way, but the raising and lowering mechanism is so constructed that it is able to support a body free of any other supporting means for a given period of time. It is possible to render the apparatus inactive, and in a position where it no longer extends into or obstructs the entry way. No particular skill is required in handling the apparatus, and there is nothing about it to get out of order.

Having described my invention, what I claim is:

1. A lifting and supporting mechanism for a demountable body, comprising a pair of fixed vertical supports spaced apart on each side of a vehicular space, vertically reciprocable members respectively carried by said supports and adapted to engage the demountable body, power mechanism associated with each support to raise or lower said members, and means independent of said mechanism to lock said members in a raised position against lowering movement.

2. A lifting and supporting mechanism for a demountable body, comprising supports mounted in fixed position adjacent a vehicular space, vertically reciprocable means carried by said supports and adapted to be projected to engage a demountable body on a vehicle adjacent the supports, and means to project said reciprocable means into position to engage the body and raise it, said reciprocable means, when idle, lying substantially flat against said supports.

3. An apparatus of the class described, comprising a plurality of upright supports, lifting brackets carried by said supports and adapted to lie substantially flat thereagainst, cylinders carried by said supports, pistons in said cylinders and means connecting said pistons and said brackets to enable the former to operate the latter.

4. The combination with a pair of entry ways adapted to support vehicles carrying demountable bodies, of a pair of supports between the entry ways, collapsible cantilever brackets on opposite sides of each of the supports adapted to underlie a demountable body in either entry way and means to move said brackets whereby they may raise such bodies in either entry way.

5. The combination with a pair of entry ways adapted to support vehicles carrying demountable bodies, of a plurality of supports bounding each entry way, extensible brackets on each support comprising a set of brackets for each entry way adapted to underlie a demountable body in respective entry ways, and means associated with each bracket to cause said bracket to be operated independently to engage or disengage a demountable body and to raise or lower such bracket.

6. The combination of an upright support, a vertically slidable bracket carried thereby and comprising a pair of vertically pivoted links, power mechanism associated with the support and adapted to raise the free end of one of the links and means whereby such movement reduces the angle between the links to extend the bracket into active position, said links being adapted to lie substantially flat against said support.

7. The combination with an entry way to be occupied by a vehicle carrying a demountable body, of supports adjacent the entry way, each support carrying a cylinder, a pressure operated piston in said cylinder, a framework movable on said support and connected to said piston, an extensible bracket unit comprising mutually pivoted links carried by said framework and adapted to engage or disengage a demountable body, depending on the relation of said piston to the cylinder.

8. An apparatus for raising a demountable body, comprising an upright support, an upright cylinder mounted thereon, a pressure operated piston in said cylinder, upright runways on said support above the cylinder, a framework slidable in said runways and connected to said piston, an extensible bracket unit carried by said framework, and means operated by the piston to cause the bracket unit to engage and disengage a demountable body, depending on the relation of said piston to the cylinder.

9. An apparatus of the character described, having in combination an upright H-shaped post, a cylinder lying adjacent the web of said post, a piston reciprocable in said cylinder, a slideway carried by said post, a frame slidable in said slideway and connected to said piston, a bracket carried by said frame, a link pivoted to said bracket and slidably retained in said slideway, and a stop on said post to collapse said link and said bracket.

10. An apparatus to raise demountable bodies, comprising an upright post, a vertical slideway on the post, a collapsible bracket comprising a pair of extensible bell cranks pivotally carried on rollers in said slideway and a pair of extensible links pivotally carried at one end by the free portion of said cranks and at the other end by rollers in said slideway, a stop to hold the links in position to make the bracket active, a stop to cause the bracket to become inactive, and means for moving the bracket along said slideway.

11. An apparatus of the class described, comprising an upright post, a slideway carried thereby, a frame slidable in said slideway, an extensible bell crank pivotally carried by said frame, a link pivotally fastened to the outer end of said bell crank and slidably carried in said slideway, a stop to limit the pivoting between said crank and the link, a stop carried by said slideway to cause the crank and link to lie against said post when said frame is in one position and means to operate said frame.

12. An apparatus of the class described, comprising a post, channels on the post to form a slideway, a frame carried at its ends by upper and lower rollers in said slideway, a bell crank pivotally carried on said frame adjacent the lower rollers, a link pivoted to the other one of said crank, rollers on said link to carry it in said slideway above said crank, a plate on said link to engage the load, a stop on said crank to engage said link and means to operate said crank and said link.

13. An apparatus to raise demountable bodies comprising a post, a slideway thereon, a frame carried at its ends on rollers in said slideway, a pair of extensible bell cranks pivotally carried on said frame adjacent the lower rollers, extensible links pivoted to the other end of said cranks, rollers on said links to carry them in said slideway above said crank, a plate across said links to engage a demountable body, a stop on said cranks to engage said links, a stop on said post to cause said cranks and links to collapse from an extended position and a latch to lock said extensible members in an open position.

14. An apparatus to raise demountable bodies, comprising a post, a slideway thereon, a pair of extensible bell cranks pivotally carried on rollers in said slideway, a pair of slotted members depending from said cranks adjacent said rollers, extensible links pivotally carried at one end by the free portion of said cranks and at the other end by rollers in said slideway and restrained in said slots, a stop in said slideway to limit the downward movement of said link rollers.

15. An apparatus to raise demountable bodies, comprising a post, a slideway thereon, an extensible bell crank pivotally carried on rollers in said slideway, a slotted member depending from said crank adjacent said rollers, an extensible link pivotally carried at one end by the free portion of said crank and at the other end by rollers in said slideway and restrained in said slot, a stop in said slideway to limit the downward movement of said link rollers causing their collapse, a locking means to retain said crank and said link in an extended position, and a fluid actuated piston to operate said extensible members.

16. An apparatus of the class described, comprising a vehicle entry way, a plurality of upright supports in fixed position adjacent opposite sides of such entry way, extensible lifting brackets carried by said supports, cylinders carried by said supports, pistons in said cylinders, and means operatively connecting said pistons and said brackets to cause the former to extend and raise the latter consequent upon raising movement of the pistons.

17. A lifting and supporting mechanism for a demountable body comprising supports mounted in fixed position adjacent a vehicular trackway, vertically reciprocable means carried by said supports to engage a demountable body to raise or lower the same, means to project said reciprocable means laterally beneath a body and to entirely withdraw them from thereunder, a cylinder and a piston adjacent each support, means to admit fluid to said cylinder to move said piston, and an operative connection between the pistons and first-named means, so arranged that said lifting and projecting means are operated consequent upon raising of the piston.

18. The combination with an entry way adapted to support a vehicle having a demountable body, of a pair of extensible toggle brackets mounted on opposite sides of the entry way adapted to underlie a demountable body, and means associated with each bracket to cause said bracket to be moved into said entry to engage and removed from said entryway to disengage a demountable body.

19. In an apparatus to raise a demountable body of a vehicle, the combination of upright supports on opposite sides of a vehicular space, an extensible bracket on each support, each bracket comprising pivotally interconnected arms with their free ends movably mounted on the support and means to move one arm relative to the other to cause the bracket to project beneath a body in the vehicular space, the bracket being then movable to raise the body.

20. In an apparatus to raise and support a demountable body of a vehicle, the combination of fixed upright columns on opposite sides of a vehicular space, an extensible bracket on each column, each bracket comprising pivotally interconnected arms with their free ends movably mounted on the column, and means to move one arm relative to the other to cause the bracket to project beneath a body in the vehicular space and to raise the bracket as a whole after it has been so projected.

BENJAMIN F. FITCH.